Dec. 13, 1960     H. W. GUNBERG     2,964,112
CO-ORDINATOR FOR FUEL FLOW AND PROPELLER GOVERNOR CONTROL
Filed Feb. 9, 1956     3 Sheets-Sheet 1
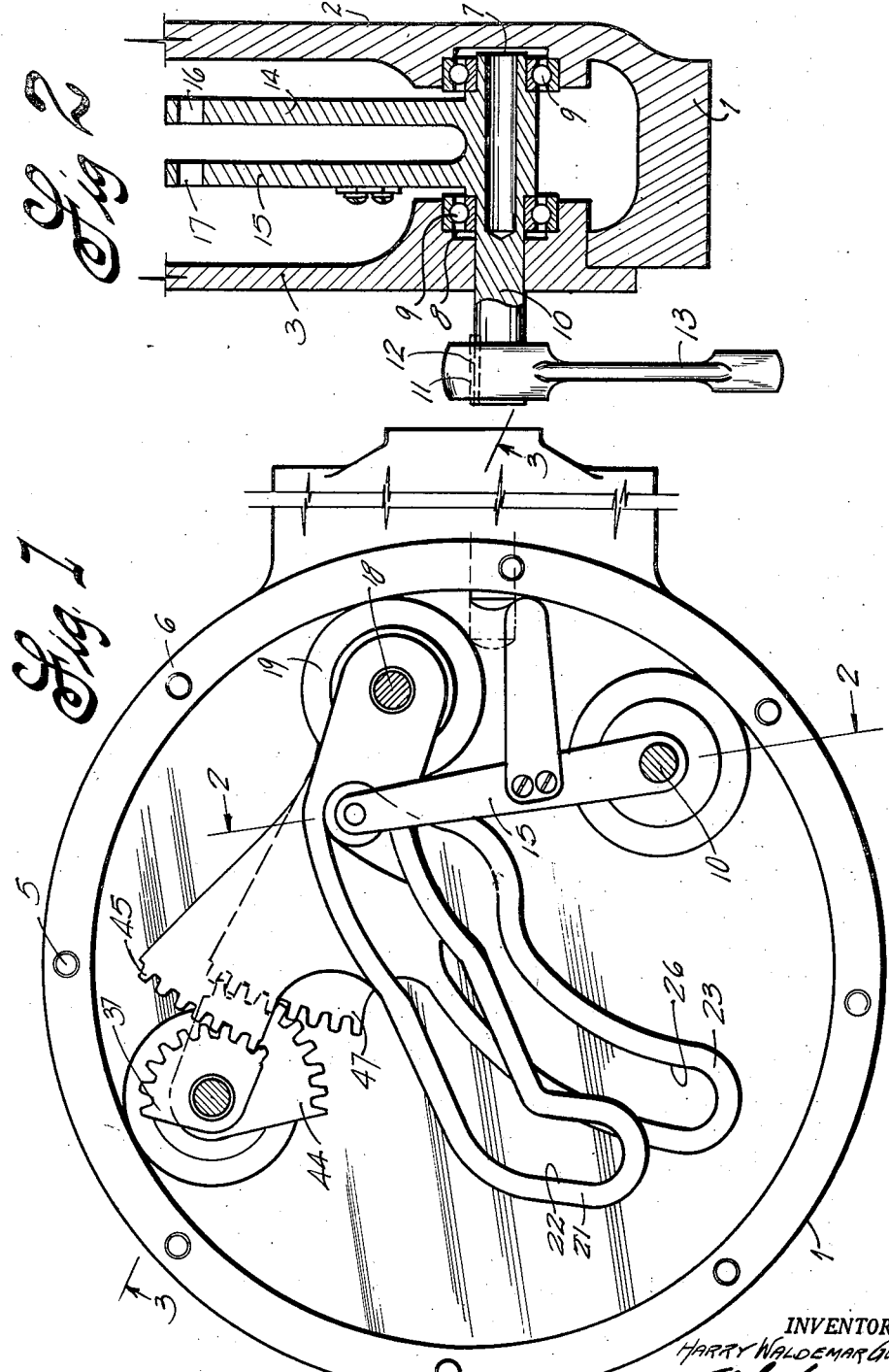
INVENTOR.
HARRY WALDEMAR GUNBERG
BY
ATTORNEYS

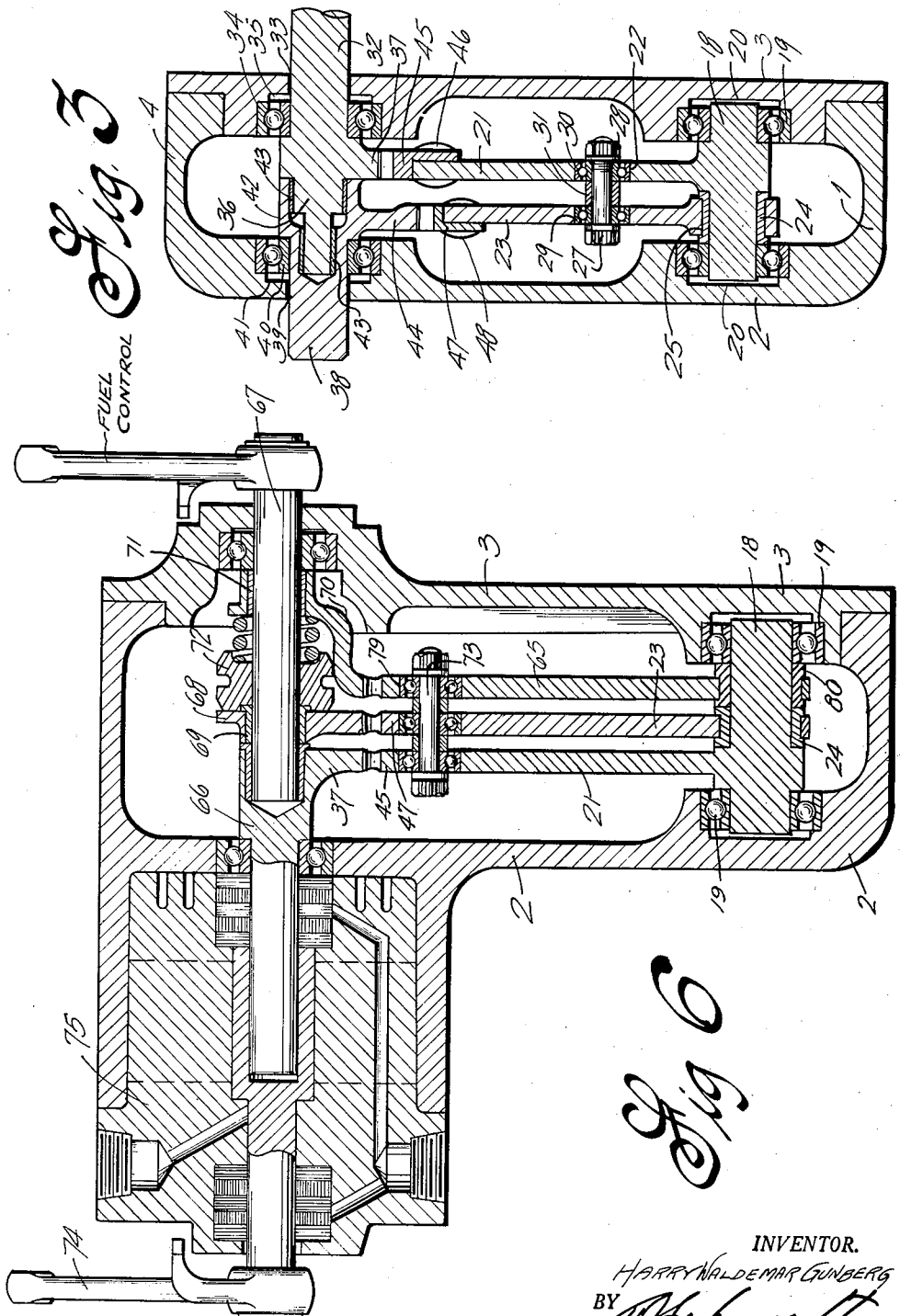

Dec. 13, 1960 H. W. GUNBERG 2,964,112
CO-ORDINATOR FOR FUEL FLOW AND PROPELLER GOVERNOR CONTROL
Filed Feb. 9, 1956 3 Sheets-Sheet 3

INVENTOR.
HARRY WALDEMAR GUNBERG
BY
ATTORNEYS

United States Patent Office 2,964,112
Patented Dec. 13, 1960

2,964,112

CO-ORDINATOR FOR FUEL FLOW AND PROPELLOR GOVERNOR CONTROL

Harry Waldemar Gunberg, West Hartford, Conn., assignor, by mesne assignments, to the United States of America as represented by the Secretary of the Navy Filed Feb. 9, 1956, Ser. No. 564,599

2 Claims. (Cl. 170—135.74)

This invention relates to a co-ordinator for fuel flow and propeller governor control.

In the operation of an aircraft it is desirable that the motions required of the pilot be reduced to a minimum. To meet the varying conditions of flight a relative positioning of many elements is often required. Thus, to obtain the maximum efficiency from an engine for a particular throttle setting it is necessary that the fuel flow and the propeller pitch governor controls be properly synchronized. This invention functions to produce that desired result by a co-ordinator which is operatively connected to the throttle. A forked lever is fastened to the co-ordinator shaft and rides in two cam slots, one of which controls the fuel supply and the other controls the propeller pitch governor. Fastened to each cam is a segment gear meshing with a mating pinion integral with separate shafts mounted concentrically in a housing, one shaft is the propeller pitch governor output shaft and the other is the fuel control shaft. By providing the gear arrangement on the cams a maximum step-up of the output levers is obtained. Thus, greater latitude of adjustments for the different types of propeller governor actuating mechanisms is available.

During the maneuvering of an aircraft while in flight, it is necessary that there be no inadvertent retarding of the throttle. This invention provides a solenoid controlled automatic operational idle stop for the fuel flow control. The solenoid will be energized during engine operation to hold the stop in position but in the event of power failure a spring will move the stop to allow the throttle to be retarded to any position.

Modern airplanes are equipped with means to reverse the propeller pitch. Therefore, a third cam capable of being engaged by a clutch is provided on the co-ordinator and this cam serves the dual purpose of controlling propeller reversing and regulation of the fuel valve on the fuel control. A time delay mechanism is provided in conjunction with this design for the propeller control.

It is an object of this invention to provide means for co-ordinating the propeller pitch governor control and the fuel flow control of an engine so that maximum output and efficiency is automatically achieved by the advancement of the throttle.

It is a further object of this invention to provide an automatic stop for the throttle so that during normal operation of the aircraft it will not be possible for the pilot to inadvertently retard the throttle.

It is a further object of this invention to incorporate in the one unit a clutch controlled mechanism for controlling the reversing of the propeller pitch and regulation of the fuel valve on the fuel control during the reversing operation.

Other objects and many of the attendant advantages of this invention will be readily appreciated as the same becomes better understood by reference to the following detailed description when considered in connection with the accompanying drawings wherein:

Figure 1 is a plan view with the cover removed of the co-ordinator.

Figure 2 is a section taken along lines 2—2 of Figure 1 and showing the arrangement of the mechanism operated by the throttle linkage.

Figure 3 is a section taken along lines 3—3 of Figure 1 showing the cam lever arms and their connection to the respective control shafts.

Figure 6 is a view in section showing a modification wherein a third cam and a time delay are incorporated in the co-ordinator.

Figure 4:
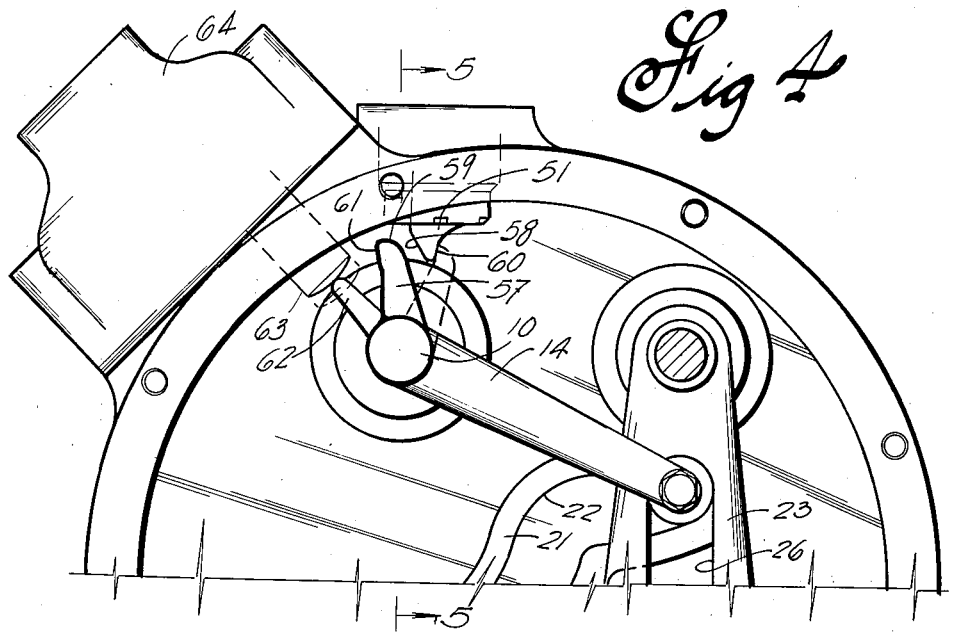
Figure 4 is a plan view of a portion of the co-ordinator and showing the operational idle stop mechanism and the propeller reversing switch.

Referring to the drawings and in more particular to Figures 1–3 there is disclosed a hollow cylindrical housing 1 having an integral base portion 2 with a flange 4 having a plurality of circumferentially spaced threaded studs 5 extending outwardly from the flange 4. A cover plate 3 having a plurality of openings for receiving the studs 5 is secured to the housing by nuts 6 threadedly engaging the studs. A recess 7 in the base and a recess 8 in the cover received ball races 9 which rotatably support a shaft 10 one end of which has serrations 11. Secured on the shaft 10 by a mating opening 12 for the serrations 11 is a power lever 13 which is operatively connected to the throttle. Between the ball races 9 a forked lever having arms 14 and 15 extends from the shaft 10 with an opening 16 and 17 respectively located near the end of each arm.

A shaft 18 is journaled for rotation in the housing by a pair of ball races 19 mounted in coaxial recesses 20 in the base of the housing and the cover. Integrally formed on the shaft 18 is a cam lever arm 21 which extends outwardly in a plane perpendicular to the longitudinal axis of the shaft 18 with a cam slot 22 in the arm. A second cam lever arm 23 is rotatably mounted on the shaft 18 by a bushing 24 surrounding the shaft and inclosed by an opening 25 in the arm 23, and the bearing is held in position by the lever arm 21 and the ball race 20 mounted in the base 2. The second lever arm 23 has a cam slot 26. The pivotal movement of the first and second cam lever arms is controlled by the forked lever arms 14 and 15. A bolt 27 extends through the openings 16 and 17 in the forked lever arms and is secured thereto by a nut 28. Mounted on the bolt 27 between the lever arms 14 and 15 are a pair of small ball bearings 29 and 30 separated by a washer 31. The ball bearing 29 operates in the cam slot 26 and the ball bearing 30 operates in the cam slot 22 to provide essentially non-frictional motion as the bearings move along the slots 22 and 26 to pivot the lever arms 21 and 23.

A shaft 32 extending through an opening 33 in the cover 3 is rotatably mounted on the cover by a ball bearing 34 mounted in a formed recess 35 in the cover. One end of the shaft 32 has an enlarged circular bearing portion 36 which adjoins a pinion gear 37 integrally formed on the shaft 32. The radius of the pinion gear exceeds that of the enlarged portion 36. Another shaft 38 extending through an opening 39 in the base 2 is rotatably mounted on the base by a ball bearing 40 mounted in a formed recess 41 in the base. The shaft 38 has a hollowed out enlarged section 42 for receiving the one end of shaft 32. Relative rotatable motion between the two shafts is obtained by connecting the shafts by bushings 43. A pinion gear 44 integrally formed on the shaft 38 extends outwardly therefrom adjacent the hollowed out section 42. The shaft 32 controls the propeller pitch governor and the shaft 38 controls the fuel flow. An arcuate rack 45 is fixedly secured to the cam lever arm 21 by rivets 46 and is in engagement with pinion gear 37. Also, an arcuate rack 47 is secured to the cam lever 23 by rivets 48 and is in engagement with pinion gear 44. Thus, rotation of the cam lever arm 21 rotates pinion gear 37 through the rack 45 to control the propeller pitch governor and rotation of the cam lever arm 23 rotates pinion gear 44 through rack 47 to control the fuel flow. By the use of the racks and gears a maximum step-up of total motion for the output levers is permitted with a minimum of cam size. It also allows for a greater latitude of adjustments for different types of propeller pitch governors.

Figure 5:
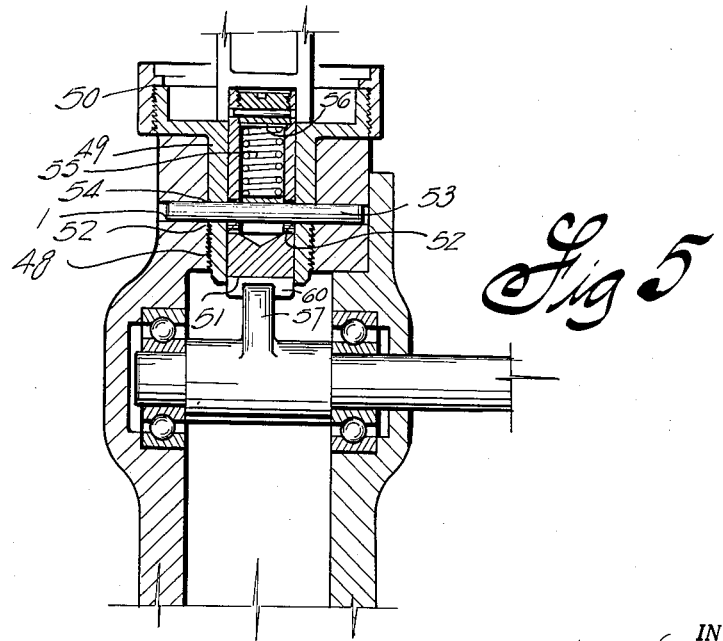
Figure 5 is a section taken along lines 5—5 of Figure 4 and showing the operational idle stop mechanism.

In Figures 4 and 5, there is shown a stop for preventing undue inadvertent retardation of the throttle during engine operation. A threaded opening 48 in the side wall of the housing 1 threadedly receives the stem 49 of a solenoid control mechanism 50. A hollow plunger stop 51 having aligned parallel slots 52 is mounted for reciprocal movement in the stem 49 subject to energization of a conventional solenoid winding. A pin 53 mounted in the housing passes through openings 54 in the stem and the slots in the plunger. The solenoid which is energized at all times during engine operation holds the stop in extended position as shown in Figure 5. In the event of an electrical power failure, a spring 55 acting against the pin 53 and a fitting 56 on the hollow stop will retract the stop. For cooperation with the stop 51, a trigger 57 is integrally formed on the throttle controlled shaft 10. As shown in Figure 4, the stop and trigger are formed with cam surfaces 58 and 59 to allow for movement in one direction while the throttle is being advanced against the action of the solenoid and with positive catching surfaces 60 and 61 to prevent movement in the opposite direction. Although not shown in the drawing it is to be understood that any suitable solenoid winding may be used to control reciprocal movement of the plunger stop 51. Similarly a suitable conventional energizing circuit such as a series circuit including a source of electrical potential, the main ignition switch of the electrical power system for the aircraft, a control switch, and the solenoid winding is preferably provided for the solenoid winding. The control switch in the solenoid energizing circuit is provided to deenergize the solenoid when it is desired to retard the throttle during engine operation.

Another automatic feature, as shown in Figure 4, is a propeller pitch reversing switch. A trigger 62 on the shaft 10 depresses the plunger 63 attached to the unit 64 which energizes the propeller pitch reversing mechanism.

In operation, the pilot moves the throttle which is connected to the lever 13 rotating the shaft 10. The cam followers 29 and 30 in the lever arms 14 and 15 rotate the cam arms 21 and 23 about the pivot 18. The racks 45 and 47 then rotate the shafts 32 and 38 to automatically position the propeller pitch and fuel flow controls. Thus, by a single operation of the pilot a multiplicity of results is produced.

In Figure 6, there is disclosed another coordinator which has a third cam lever arm 65, similar to the cam lever arms 21 and 23, for controlling the schedule of the delivery of fuel when the propeller pitch is reversed. Two relatively rotatable shafts 66 and 67, similar to the shafts 32 and 38, are mounted for rotation in the base 2 and cover 3. A pinion gear 68 is rotatably mounted by a bushing 69 on the shaft 67, which regulates the fuel control. Rotation of the pinion gear 68 is caused by the rack 47 attached to the cam lever arm 23. Another pinion gear 70 is rotatably mounted on the shaft 67 by a bushing 71 and the pinion 70 is rotated by a rack on the cam lever arm 65. A clutch 72 is mounted on the shaft 67 for relative sliding but non-rotatable motion. The clutch 72 operates on the shaft 67 to couple either the pinion gear 68 or the pinion gear 70 to the shaft 67. Rotation of the cam lever arms 21, 23 and 65 is caused by a three cam follower assembly 73 actuated by a mechanism similar to that of Figures 1 and 2. The position of the clutch 72 is controlled by the pilot.

The co-ordinator shown in Figure 6 is also provided with a time delay for the propeller pitch governor control. The shaft 66 leading to the output lever 74 to the propeller governor is connected to a time delay unit 75 of the rotary vane servo type which is connected to the output lever 74.

The coordinator of Figure 6 operates in the following manner: The cam lever arms 21, 23 and 65 follow movement of the aircraft throttle by the pilot. Movement of lever arm 21 produces a rotary adjustment of shaft 66 which continuously controls the pitch angle of the aircraft propeller. Clutch 72 normally occupies a position on shaft 67 in which gear 68 is coupled to shaft 67. Thus, movement of cam lever arm 23 with the aircraft throttle controls rotary movement of gear 68 and shaft 67 in a clockwise direction for automatic control of the flow of fuel to the engine.

When the pilot desires to reverse the pitch of the propeller, he rotates shaft 10 in a counter-clockwise direction (see Fig. 4) to a point where shaft 67 closes off the fuel control valve to the engine and cam 62 on shaft 10 engages button 63 of the propeller pitch reversing mechanism 64. At the same time the clutch mechanism 72 is slidably moved along shaft 67 until it engages gear 70. Continual rotation of shaft 10 in the counter-clockwise direction and consequent rotation of pinion gear 70 by rack 79 then provides the desired fuel schedule to the engine when the pitch of the propeller is reversed.

Obviously many modifications and variations of the present invention are possible in the light of the above teachings. It is therefore to be understood that within the scope of the appended claims the invention may be practiced otherwise than as specifically described.

What is claimed is:

1. An apparatus for simultaneously and continuously coordinating fuel flow and propeller pitch angle control in an aircraft engine having a throttle, a propeller pitch angle control means, and a fuel control, said apparatus comprising, in combination, a control lever operatively connected to the throttle; a shaft rotatably positioned in accordance with movement of the control lever; a forked lever secured to the shaft for rotation therewith; propeller pitch reversing means having a control switch; a first slotted cam follower device operatively connected to the forked lever; means responsive to movement of the first cam follower device for controlling flow of fuel to the engine; a second slotted cam follower device operatively connected to the forked lever; and means responsive to movement of the second cam follower device for controlling propeller pitch angle of the engine; means attached to the said shaft for operatively engaging the control switch when the control lever is moved to a predetermined position; and a solenoid operated latch mechanism which restrains rotary movement of the shaft in a throttle decelerating direction beyond a predetermined operational idling position.

2. An apparatus for simultaneously and continuously coordinating fuel flow and propeller pitch angle control in an aircraft engine having a throttle, a propeller pitch angle control means, and a fuel control, said apparatus comprising, in combination, a control lever operatively connected to the throttle; a shaft rotatably positioned in accordance with movement of the control lever; a forked lever secured to the shaft for rotation therewith; propeller pitch reversing means having a control switch; a first slotted cam follower device operatively connected to the forked lever; means responsive to movement of the first cam follower device for controlling flow of fuel to the engine; a second slotted cam follower device operatively connected to the forked lever; and means responsive to movement of the second cam follower device for controlling propeller pitch angle of the engine; a third slotted cam follower device operatively connected to the forked lever; and means responsive to movement of the third cam follower device for controlling flow of fuel to the engine when the propeller pitch is in its reversed position; means attached to the said shaft for operatively engaging the control switch when the control lever is moved to a predetermined position; and a solenoid operated latch mechanism which restrains rotary movement of the shaft in a throttle decelerating direction beyond a predetermined operational idling position.

References Cited in the file of this patent

UNITED STATES PATENTS

| | | |
|---|---|---|
| 2,336,844 | Buck | Dec. 14, 1943 |
| 2,435,037 | Gardener et al. | Jan. 27, 1948 |
| 2,500,811 | Forsyth | Mar. 14, 1950 |
| 2,612,226 | Crum | Sept. 30, 1952 |
| 2,628,684 | Slatter et al. | Feb. 17, 1953 |
| 2,664,166 | Swaab | Dec. 29, 1953 |
| 2,851,113 | Irwin et al. | Sept. 9, 1958 |

FOREIGN PATENTS

| | | |
|---|---|---|
| 649,671 | Great Britain | Jan. 31, 1951 |